US011795050B2

(12) United States Patent
Rivard

(10) Patent No.: US 11,795,050 B2
(45) Date of Patent: Oct. 24, 2023

(54) DEVICE AND METHOD FOR PUMPING LOW EVAPORATION PRODUCTS UNDER VACUUM

(71) Applicant: ORTEC EXPANSION, Aix-en-Provence (FR)

(72) Inventor: Daniel Rivard, Paris (FR)

(73) Assignee: ORTEC EXPANSION, Aix-en-Provence (FR)

( * ) Notice: Subject to any disclaimer, the term of this patent is extended or adjusted under 35 U.S.C. 154(b) by 30 days.

(21) Appl. No.: 17/536,375

(22) Filed: Nov. 29, 2021

(65) Prior Publication Data

US 2022/0169496 A1 Jun. 2, 2022

(30) Foreign Application Priority Data

Nov. 30, 2020 (FR) ..................................... 2012381

(51) Int. Cl.
| | |
|---|---|
| B67D 7/76 | (2010.01) |
| B67D 7/02 | (2010.01) |
| B67D 7/62 | (2010.01) |
| B67D 7/78 | (2010.01) |
| F04F 5/04 | (2006.01) |

(52) U.S. Cl.
CPC ............ *B67D 7/76* (2013.01); *B67D 7/0277* (2013.01); *B67D 7/62* (2013.01); *B67D 7/78* (2013.01); *F04F 5/04* (2013.01)

(58) Field of Classification Search
CPC . B67D 7/76; B67D 7/766; B67D 7/78; B67D 7/0277; F04F 5/04
See application file for complete search history.

(56) References Cited

U.S. PATENT DOCUMENTS 3,658,827 A 4/1972 Bezou

FOREIGN PATENT DOCUMENTS

| CN | 210484218 U | * | 5/2020 | |
|---|---|---|---|---|
| DE | 483213 C | | 10/1929 | |
| FR | 1559570 A | | 3/1969 | |
| FR | 2576315 A | * | 7/1986 | ............... C11B 3/14 |
| GN | 2761896 Y | | 3/2006 | |
| JP | 4227692 B2 | | 2/2009 | |
| WO | WO-0177006 A1 | * | 10/2001 | ............... B67D 7/02 |

OTHER PUBLICATIONS

French Search Report issued in corresponding French Patent Application No. EP 2012381 dated Jul. 19, 2021.

* cited by examiner

*Primary Examiner* — Timothy L Maust
(74) *Attorney, Agent, or Firm* — Morgan, Lewis & Bockius LLP

(57) ABSTRACT

The device for pumping products from a pumping area (2) to an enclosure (3) comprises two tanks, a transfer system (8) which generates a suction of the products from the pumping area (2) to the tanks (4A, 4B) and a transfer of the non-gaseous products from the tanks (4A, 4B) to the enclosure (3), valves (3A, 3B, 3D, 3D, 3I, 4C, 4D, 4I, 4J) to, alternately, allow or block the communication from one tank (4A, 4B) to the pumping area (2) and a communication from the other tank (4A, 4B) to the enclosure (3), and a control system (25). The transfer system (8) comprises a suction unit (13) provided with hydro-ejectors (13A, 13B) connected to each tank (4A, 4B) and generating the suction of the products and a transfer unit (20) provided with a pump connected to the tanks (4A, 4B) to transfer non-gaseous products to the enclosure (3).

12 Claims, 3 Drawing Sheets

DEVICE AND METHOD FOR PUMPING LOW EVAPORATION PRODUCTS UNDER VACUUM

TECHNICAL FIELD

The present invention relates to a device and a method for pumping low evaporation products under vacuum from a pumping area to a storage enclosure.

In particular, the invention relates to a device and a method for pumping products such as hydrocarbons, acids, bases, sewage sludge, biological sludge, primary sludge, and in general any product likely to generate an explosive atmosphere and/or to emit volatile organic compounds into the atmosphere during pumping.

PRIOR ART

Many industries, for example chemical, petrochemical, food processing, metallurgical, etc., generate sludge that can produce explosive atmospheres and/or emit volatile polluting compounds. It is therefore necessary to pump this sludge regularly in order to convey it to specialized treatment and/or storage sites.

Such pumping operations are also necessary, in particular, to purge industrial sewers, to recover waste produced by a high-pressure water cleaning of industrial installations, to extract sludge from sewage treatment plants, to dewater tank bottoms so as to allow their inspection or maintenance, etc.

These pumping operations present numerous risks to the health and the safety of operators and local residents and to the protection of installations and the environment, which are related to the explosive nature of the products pumped and the emission of harmful gases such as the volatile organic compounds. For example, the pumping of 4 cubic meters of unleaded 98 gasoline can cause a rejection of 114 liters of fuel in gaseous form, which is equivalent to 210 cubic meters of toxic gas into the atmosphere.

Because the volatile organic compounds are heavier than air, they can form dangerous gaseous pockets near the pumping operation.

Furthermore, the industrial cleaning activity also require the purging and degassing of all pumping means due to the diversity of the products treated, the combination of which could generate a dangerous chemical reaction.

To carry out such pumping operations of liquid or pasty waste, it is common to use a vacuum pump to empty a tank containing the products to be pumped into a vacuum cistern. This technique allows both pumping of product slicks (no strainer) and avoids the passage of dangerous products in the body of a rotating machine. On the other hand, it can promote the evaporation of volatile waste by lowering the boiling point, the transfer of the products to be pumped being carried out either by a depression exerted on the products or by aeraulic mode where the speed of air admitted induces the movement. For this purpose, a suction hose is permanently immersed in the product to be pumped. The advantage of this technique is that the vacuum pump can be stopped during the pumping operation while maintaining suction capacity as long as the differential with respect to atmospheric pressure exists. This technique allows the tank to be drained completely. Moreover, it allows the pump to be installed at great distances from the product, avoiding the contact of the product with the pump except for vapors and gases and limiting the quantity of pollutants rejected.

However, this type of technique has two major disadvantages. On the one hand, the pumping in industrial cleaning is most often carried out on bin bottoms which only very rarely allow the suction hose to be completely immersed. As a result, air is drawn in at the suction side which, if not compensated for in the case of positive displacement pumps, would stop the pumping operation. On the other hand, it favors the boiling of the products pumped under vacuum at low temperature with the consequence of rejecting gases and volatile products into the atmosphere, thus increasing the environmental and explosion risks.

Furthermore, during the pumping of 4 cubic meters of super 98 gasoline by known pumping methods, the first liters of gasoline that enter the large tank under vacuum are subjected to vacuum during the entire pumping process, resulting in an acceleration of the evaporation of the pumped gasoline.

Among the known pumping devices, some use biphasic separators to favor the degassing of the products pumped into the tank in order to reduce the emission of volatile organic compounds. However, the internal arrangement of this type of device in a storage enclosure does not allow it to be filled, which results in a loss of volume of approximately 10% to 15%.

A device for pumping a product by vacuum suction is known from the document FR1 559 570 of the applicant, which is intended to overcome this problem at least partly. This pumping device comprises a vacuum source, a nozzle for sucking the product, a pressure source, two transit tanks for product, and a set of controlled valves simultaneously and alternately connecting one of the transit tanks to the vacuum source and to the suction nozzle and the other of the transit tanks to the pressure source and to a reception tank of the product.

The vacuum suction and the pressurization of the transit tanks are preferably carried out by one and the same vacuum pump. The vacuum source and the pressure source being respectively constituted by the suction orifice and by the discharge orifice of the vacuum pump. Thus, the two transit tanks work in alternation, which allows to limit the vacuum exposure time of the pumped products, so as to limit the physical phenomenon of desorption of the gases of the products.

However, the solution of the document FR1 559 570 is not completely satisfactory. In particular, the use of a single vacuum pump for suction and discharge may limit the suction capacity and increase the time required to vacuum the liquids in the transit tanks, with a possible increase in the rejection of volatile products.

DESCRIPTION OF THE INVENTION

It is an object of the present invention to remedy at least this disadvantage. It concerns a device for pumping products from a pumping area to a storage enclosure, said pumping device comprising:

two transit tanks configured to receive the products to be pumped, separating into non-gaseous products and gaseous products, each of said transit tanks being provided with a product inlet, a non-gaseous product drain outlet and a suction orifice;

a transfer system configured to generate a suction of the products from the pumping area to said transit tanks and to generate a transfer of the non-gaseous products from said transit tanks to the storage enclosure;

a plurality of valves adapted to be controlled and configured to alternately either allow or block a communication of one of said transit tanks with the pumping system and the pumping area and a communication of the other of said transit tanks with the pumping system to the storage enclosure; and a control system for said plurality of valves.

According to the invention, said transfer system comprises:

a suction unit provided with at least two hydro-ejectors connected to the suction orifice of each of said transit tanks and configured to at least generate the suction and the separation of the products to be pumped into gaseous and non-gaseous products, the suction of the products from the pumping area being generated by a vacuuming of the transit tanks by limiting the vacuum exposure time; and a transfer unit distinct from the suction unit, which is provided with a volumetric transfer pump connected to the drain outlet of each of said transit tanks and which is configured to at least generate the transfer of the non-gaseous products to the storage enclosure.

Thus, thanks to the invention, the time of pumping the products, during which the desorption phenomena of the gases take place, is minimized due to the small volume of the products pumped under vacuum. Indeed, there is no accumulation of time that the pumped products spend under vacuum.

In particular, if the volume of the products to be pumped is small, the suction of the products to be pumped can be interrupted. The suction unit allows the pumping to be restarted quickly and, at the same time, the transfer unit allows the degassed products to be discharged into the storage enclosure.

Moreover, the transfer of the non-gaseous products is obtained by a volumetric pump which limits the exposure time of the products to the vacuum and thus the desorption of the gases in the storage enclosure and allows the filling of the storage enclosure from the bottom without a bi-phase separator.

Advantageously, the diameter of each of said transit tanks is between 70 centimeters and 80 centimeters.

Furthermore, the ratio between the volume and the upper surface of the transit tanks in contact with the products is between ⅟₃₀ and ½₅.

Thus, by considering transit tanks of reduced dimensions, the surface to the vacuum is reduced, which limits the formation of gases resulting from thermal desorption phenomena.

Furthermore, advantageously, the suction unit is provided with a high-pressure pump supplying said at least two hydro-ejectors with high-pressure water, each of said at least two hydro-ejectors discharging the water into at least one water tank which supplies said high-pressure pump.

Thus, the suction unit works on a water recycling principle.

Advantageously, one of said at least two hydro-ejectors is configured to compensate for suction variations over time.

Additionally, advantageously, the pumping device comprises a network for rejecting the gases produced during the pumping to a rejection area, the rejection network comprising:

at least one conduit for rejecting the gases produced by said transit tanks and connecting the suction orifice of each of said transit tanks to said at least two hydro-ejectors, said at least one conduit also contributing to the vacuuming by suction of each of said transit tanks;

at least one water transfer conduit connecting said at least two hydro-ejectors to at least one water tank; and a pipeline coming out of said at least one water tank so as to disperse the gases produced by said transit tanks in the rejection area.

Preferably, the rejection network also comprises a first duct for rejecting the gases produced by desorption into the storage enclosure, connecting the storage enclosure to said at least one water tank.

According to a particular embodiment, the suction unit is configured to generate a vacuuming of the storage enclosure, to assist in the direct pumping through a tail pipe of products comprising solid elements. According to this particular embodiment, the rejection network also comprises a second duct for rejecting the gases produced by desorption into the storage enclosure connecting said storage enclosure to said at least two hydro-ejectors, said second duct also contributing to the vacuuming of the storage enclosure.

Furthermore, according to a particular embodiment, the pumping device comprises a cyclone filter configured to filter the gases coming from each of said transit tanks, said cyclone filter being arranged between said at least two hydro-ejectors and each of said transit tanks.

Furthermore, the cyclone filter is also configured to filter the gases coming from the storage enclosure, said cyclone filter being arranged between said at least two hydro-ejectors and said storage enclosure.

According to a particular embodiment, the transfer unit is also configured to transfer said non-gaseous products from the storage enclosure to another storage area.

The transfer unit is thus used for both filling and draining the storage enclosure. The transfer unit can also pump liquid or pasty products from a bin and discharge the non-gaseous products to another storage area.

Furthermore, advantageously, the filling level of each of said transit tanks is detected by radar sensors.

The present invention also relates to a method for pumping products from a pumping area to a storage enclosure.

According to the invention, said product pumping method comprises the following implemented alternately steps:

a first step of controlling valves consisting of allowing the suction of products from the pumping area to a first transit tank previously vacuumed by a suction unit and of separating the pumped products into non-gaseous products and gaseous products in said first transit tank and, simultaneously, of allowing the transfer of the non-gaseous products by a transfer unit from the second transit tank to the storage enclosure; and a second step of controlling valves consisting of allowing the products to be sucked from the pumping area into the second transit tank previously vacuumed by the suction unit and of separating the pumped products into non-gaseous products and gaseous products in said second transit tank and, at the same time, of allowing the non-gaseous products to be transferred by the transfer unit from the first transit tank to the storage enclosure.

Thus, thanks to the invention, the time of pumping the products, i.e. the vacuum exposure time, during which the desorption phenomena of the gases take place, is minimized. In particular, if the volume of the products to be pumped is small, the suction of the products to be pumped can be interrupted. The suction unit allows the pumping to be restarted quickly and, at the same time, the transfer unit allows the degassed products to be discharged into the storage enclosure. The transfer of the non-gaseous products is carried out by a positive displacement pump (part of a transfer unit which is distinct from the suction unit).

According to a preferred embodiment, the maximum vacuum duration of the products pumped into the transit tanks is less than or equal to 12 seconds.

Advantageously, said pumping method also comprises a gas rejection step, implemented simultaneously with the implementation of the first and second valve control steps, this gas rejection step consisting of rejecting the gases produced during the separation of the products in each of said transit tanks to a rejection area by means of a rejection network.

Furthermore, according to a particular embodiment, said pumping method comprises a vacuum step consisting of generating, by means of the suction unit, a direct vacuuming in the storage enclosure, to favors the pumping of products comprising solid elements in the storage enclosure.

Furthermore, said pumping method further comprises a step of transferring the non-gaseous products from the storage enclosure to another storage area by the transfer unit.

The present invention further relates to:
a unit for pumping and storing products coming from a pumping area, which comprises a product pumping device, such as the one described above, and a storage enclosure; and
a hydro-cleaner which is provided with such a pumping and storage unit.

BRIEF DESCRIPTION OF FIGURES

The attached figures will make it clear how the invention can be realized. In these figures, identical references designate similar elements.

DETAILED DESCRIPTION

Figure 1:
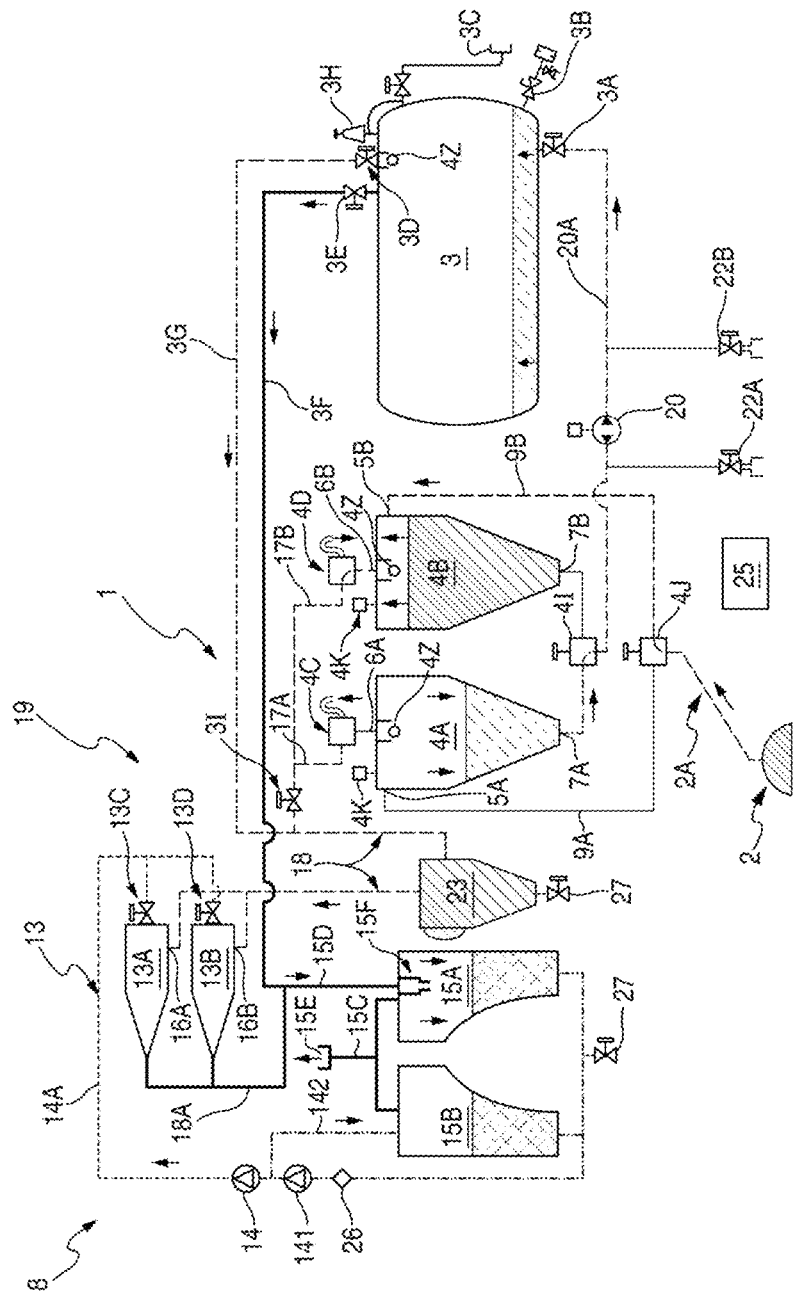
FIG. 1 is a schematic view of a particular embodiment of a pumping device in a first phase of operation.
Figure 2:
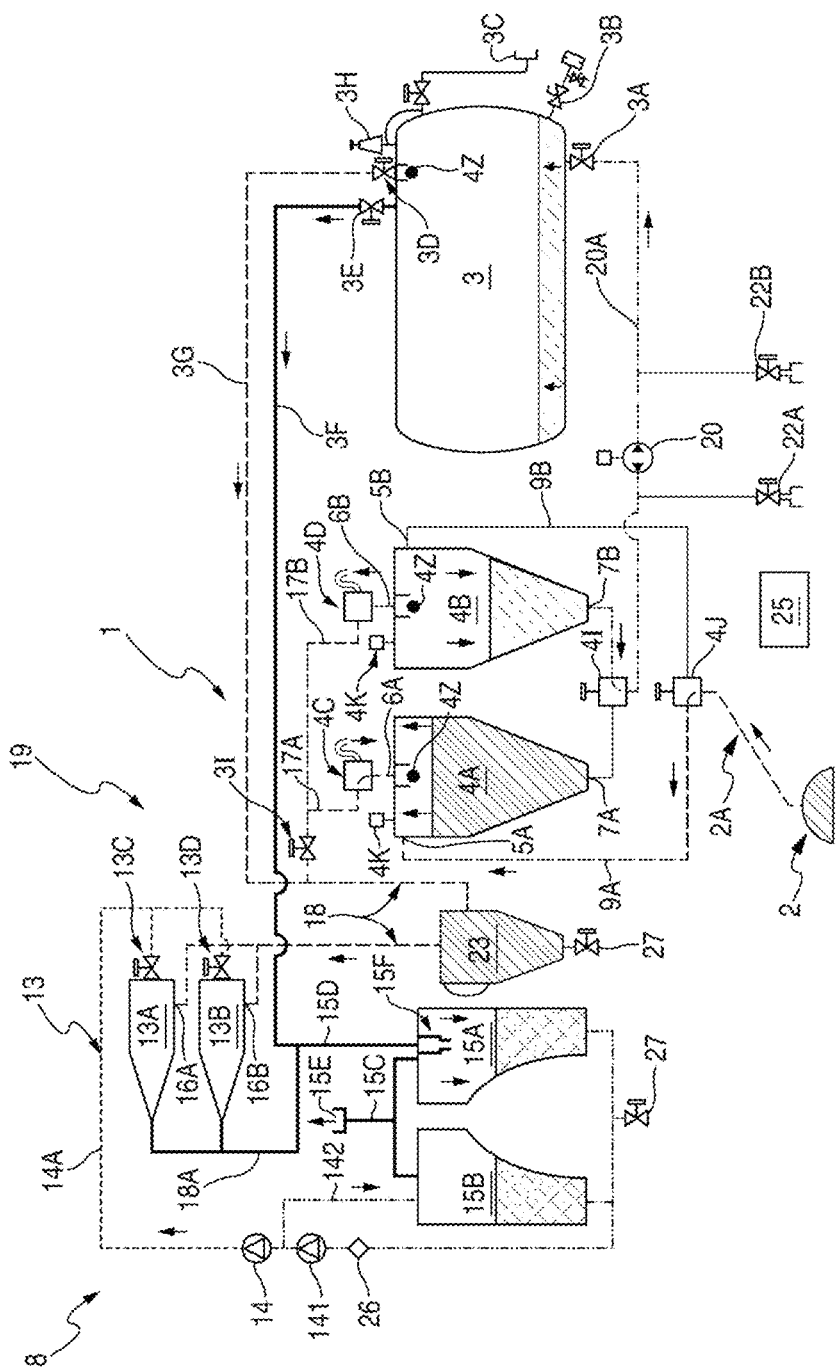
FIG. 2 is a schematic view of the pumping device of FIG. 1 in a second operating phase.

The device for pumping products (hereinafter "pumping device 1") allowing to illustrate the invention and shown schematically in FIGS. 1 and 2, is a device intended to pump products such as sludge, solvents, oil slicks, etc., from a pumping area 2 to a storage enclosure 3.

In the scope of the present invention:
"pumping area" means a place, such as a particular location in particular on an industrial site or a cistern or an other container, where the products are located that are to be pumped, for example, to be moved to a specialized treatment site; and
"storage enclosure" means a container such as a tank, a bin, a cistern, etc., intended to receive the pumped products. This container can be mounted on a vehicle, for example, as described below in a particular application, to convey the stored products to a treatment site.

As shown in FIGS. 1 and 2, the pumping device 1 comprises two transit tanks 4A and 4B. These transit tanks 4A and 4B are preferably cyclone or hydro-cyclone tanks. Each of these transit tanks 4A and 4B is intended to contain products to be pumped. The transit tanks 4A and 4B are configured to allow to reduce the vacuum exposure time of the pumped product in order to minimize the risk of physical transformation of the pumped products into gas.

Each of the transit tanks 4A and 4B is provided with a product inlet 5A, 5B for receiving the products, a drain outlet 7A, 7B for discharging the non-gaseous products resulting from the separation of the pumped products into different phases to a storage enclosure 3, and a suction orifice 6A, 6B for vacuuming or venting.

According to a preferred embodiment, each of the transit tanks 4A, 4B has a diameter between 70 centimeters and 80 centimeters. Furthermore, each of the transit tanks 4A, 4B has a small capacity, preferably between 100 and 150 liters. Furthermore, the ratio between the volume and the surface of the transit tanks 4A and 4B in contact with the pumped products is preferably comprised in a ration between $\frac{1}{30}$ and $\frac{1}{25}$. The desorption phenomena in the transit tanks 4A and 4B are related to their dimensions and to the vacuum surface of the products pumped into the transit tanks 4A and 4B. At least these two parameters allow to reduce the exposure to vacuum of the pumped products in time and surface and to separate in the transit tanks 4A and 4B the gaseous products generated by the vacuuming in aeraulic mode from the non-gaseous products. This leads to a reduction in the amount of pollutant gases. For example, the pumping of 4 cubic meters of unleaded gasoline 98 by the pumping device 1 generates fourteen liters of fuel in gaseous form, instead of 114 liters in the known devices, which means a reduction of toxic gas emission in the atmosphere of more than eight times.

Thus, the vacuum exposure time of the pumped products is reduced, for example for 4 cubic meters, from 240 seconds in the case of direct pumping by the storage enclosure 3 to 12 seconds by the transit tanks 4A and 4B, which corresponds to a reduction in the vacuum time of twenty times compared to the conventional pumping means. Moreover, in the case of a direct pumping through the storage enclosure 3, the greater the volume of products pumped, the greater the vacuum exposure time of the products and therefore the production of gas by desorption. On the contrary, in the case of the pumping device 1 with transit tanks 4A and 4B, the vacuum exposure time of the pumped products does not depend on the volume of pumped products and remains constant.

In a particular embodiment, radar sensors 4K may be provided to detect the filling level of the tanks 4A and 4B. These radar sensors 4K are more efficient than mechanical means. In addition, each of the transit tanks 4A, 4B may be provided with floating balls 4Z allowing to block any leakage of products through the suction orifice 6A, 6B.

The pumping device 1 also comprises a pumping system 8, which can generate a suction of the products from the pumping area 2 towards the transit tanks 4A and 4B and generate a discharge of the non-gaseous pumped products following the thermal desorption phenomena in the transit tanks 4A and 4B towards the storage enclosure 3.

According to the invention, this pumping system 8 is formed by a suction unit 13 and a transfer unit 20. As shown in FIGS. 1 and 2, the suction unit 13 and the transfer unit 20 are two separate units.

The suction unit 13 generates a suction of the products from the pumping area 2 by a vacuuming of the transit tanks 4A and 4B. It is connected to the suction orifices 6A and 6B of the transit tanks 4A and 4B. The products sucked from the pumping area 2 to each of the transit tanks 4A, 4B flow through product transfer conduits 9A and 9B which connect the pumping area 2 (e.g. via a common conduit) to the product inlets 5A and 5B of the transit tanks 4A and 4B.

More particularly, the suction unit 13 (also referred to as vacuum unit) comprises at least two hydro-ejectors 13A and 13B. The hydro-ejectors 13A and 13B are connected to a high-pressure pump 14, which supplies them with high-pressure water through a conduit 14A on which valves 13C and 13D are arranged. The high-pressure pump 14 allows to ensure a flow of water pressure as required into each of the hydro-ejectors 13A, 13B when the valves 13C and 13D are opened.

Contrary to a vacuum pump whose flow rate is fixed by its rotation speed, the use of a high-pressure pump allows to modulate the flow rate of high-pressure water that it injects into the hydro-ejectors 13A and 13B. A vacuum pump can vary its rotational speed by a factor of 1.5. For example, its rotation speed can vary from 1000 cubic meters per hour to 1500 cubic meters per hour or from 1500 cubic meters per hour to 3000 cubic meters per hour. However, when the suction unit 13 has generated the vacuum in the transit tanks 4A and 4B in a few minutes, it is sufficient to simply compensate for the air intakes which may require, for example, 20% of the flow rate. Such a reduction is possible with the high-pressure pump 14. This contributes to lower maintenance costs. The modulation of the water flow rate may also be generated by a booster pump 141 arranged upstream of the high-pressure pump 14. In addition, the high-pressure pump allow to generate a pressure of between 500 bar and 2000 bar.

The hydro-ejectors 13A and 13B discharge the water supplied by the high-pressure pump 14 into a water tank 15A by means of the conduits 18A and 15D. This water tank 15A communicates with another water tank 15B so that both water tanks 15A and 15B serve as water tanks for the high-pressure pump 14. Each water tank 15A, 15B is provided with a valve 27 for draining and preventing freezing. Each water tank 15A, 15B also comprises a bursting pot 15F. The presence of two water tanks 15A and 15B, arranged on either side of the storage enclosure 2, results from the need to balance the pumping device 1. According to a particular embodiment, a water filter 26 is arranged between the water tanks 15A and 15B and the high-pressure pump 14. Other filters, including a self-cleaning filter and a five micron bag filter, may also be arranged between the booster pump 141 and the high-pressure pump 14.

Each of the hydro-injectors 13A, 13B is provided with a suction mouth 16A, 16B which is connected to the suction orifice 6A, 6B of each transit tank 4A, 4B by means of, in particular, rejection conduits 17A, 17B and 18 under vacuum.

Thus, the passage of water in the hydro-ejectors 13A and 13B generates, by Venturi effect, a draft of air at the level of the suction mouth 16A, 16B of each hydro-ejector 13A, 13B. This draft generated in the conduits 17A, 17B and 18 produces the vacuuming of the transit tanks 4A and 4B. To create the Venturi effect, the water has a good efficiency, better than air for example. In addition, the water allows the gases to be trapped by wetting. In addition, the use of the Venturi effect with water at high-pressure (about 300 bar) allows a vacuum of 90% to be obtained.

In a preferred embodiment, one of the hydro-ejectors 13A is used to generate the initial suction or initial vacuuming of the transit tanks 4A and B and the other hydro-ejector 13B is configured to compensate the variations or air intakes over time once the vacuuming is generated.

On the other hand, the non-gaseous products may contain solid elements so that they are pumped directly into the storage enclosure 3 by a vacuuming and by pumping by means of a pipeline 3C located near the bottom of the storage enclosure 2.

In this particular embodiment, the suction unit 13 generates a suction in the storage enclosure 3 by means of a duct 3G connecting the suction mouth 16A, 16B of each hydro-ejector 13A, 13B to an orifice arranged on the storage enclosure 3. This orifice is opened or closed by a valve 3D arranged on the duct 3G.

As shown in FIGS. 1 and 2, the transfer unit 20 causes the non-gaseous products (coming from the separation of the products in the transit tanks 4A and 4B) to be drained into the storage enclosure 3. The non-gaseous products flow through a transfer conduit 20A which connects the transfer outlets 7A and 7B to the storage enclosure 3. A valve 3A is arranged on the conduit 20A in the vicinity of a product inlet in the bottom of the storage enclosure 3.

In a preferred embodiment, the transfer unit 20 comprises a positive displacement pump 20 which pumps the non-gaseous products and discharge them into the storage enclosure 3. This positive displacement pump 20 is mounted on the transfer conduit 20A so that it is connected to the discharge outlet 7A, 7B of each of the transit tanks 4A, 4B and the inlet of non-gaseous products of the storage enclosure 3. For example, the positive displacement pump 20 is a ROOTES type positive displacement pump for fluids and pastes.

According to a particular embodiment, the discharge direction of the positive displacement pump 20 may be reversed. The positive displacement pump 20 can then discharge the non-gaseous products from the storage enclosure 3 to another storage area (not shown). "Another storage area" is defined as another storage enclosure, a dedicated treatment and/or storage site, etc. Valves 22A and 22B may be arranged on either side of the positive displacement pump 20 so as to draw in or discharge the non-gaseous products depending on the direction of operation. The positive displacement pump 20 has a dual function of filling and draining the storage enclosure 3 and also offers the possibility of being used as a simple transfer pump.

In addition, the pumping device 1 also comprises a gas rejection network 19, in which the gases generated during the pumping of the products circulate. This network 19 is configured to reject these gases to a rejection area. For this purpose, it comprises the conduits 17A and 17B which connect the suction orifice 6A, 6B of each transit tank 4A, 4B to the suction mouth 16A, 16B of each hydro-ejector 13A, 13B of the suction unit 13. Thus, the vacuuming of the transit tanks 4A, 4B contributes to the rejection of gases resulting from the separation of the pumped products into non-gaseous and gaseous products due to the desorption phenomena in these tanks 4A and 4B.

The network 19 also comprises the water transfer conduit 18A which connects the hydro-ejectors 13A and 13B to the water tank 15A. Thus, the gas vapors entering the hydro-injectors 13 through the suction mouths 13A and 13B are trapped by wetting in the water which is discharged into the water tanks 15A and 15B. This gas capture provides environmental assistance to the rejection of potentially toxic and polluting gases.

As shown in FIGS. 1 and 2, the gas rejection network 19 also comprises a pipeline 15C which is mounted at one end on the upper part of the water tanks 15A and 15B and whose other end 15E opens onto the rejection area so that the gases trapped in the water can escape to the rejection area.

The gases to be rejected also result from desorption phenomena of the products located on the surface of the storage enclosure 3. According to a particular embodiment, the network 19 also comprises a rejection duct 3F which connects the storage enclosure 3 directly to the water tank 15A.

Furthermore, in a particular embodiment in which the suction unit 13 generates a suction in the storage enclosure 3, the duct 3G connecting the suction mouth 16A, 16B of each hydro-ejector 13A, 13B to the orifice near the valve 3D contributes to the rejection of the gases resulting from the desorption in the storage enclosure 3 and forms part of the rejection network 19.

As shown in FIGS. 1 and 2, the pumping device 1 also comprises a cyclone filter 23 which is arranged between the hydro-ejectors 13A and 13B on one side and the transit tanks 4A and 4B and the storage enclosure 3 on the other side. The cyclone filter 23 is also equipped with a drain valve 27, which also allows it to be set free of frost.

In this embodiment, the conduits 17A and 17B and the duct 3G have a common part on which the cyclone filter 23 is mounted so that the gases circulating in these conduits are filtered by the cyclone filter 23 before entering the hydro-ejectors 13A and 13B. The filtering of the gases in the cyclone filter 23 thus allows, in particular, to eliminate small particle gases which could pollute the suction unit 13.

In addition, the pumping device 1 is also provided with a plurality of valves 3A, 3B, 3D, 3E, 3I, 4C, 4D, 4I and 4J, the opening, the closing and the orientation of which are controlled by a control system 25 of the usual type, not further described in this description. The opening, the closing and the orientation of this plurality of valves 3A, 3B, 3D, 3E, 3I, 4C, 4D, 4I and 4J can, alternately, either allow or block the pumping of the products from the pumping area 2 to one of the transit tanks 4A, 4B vacuumed by the suction unit 13 and the discharge of the non-gaseous products from the other transit tank 4B, 4A to the storage enclosure 3 by the discharge unit 20, as specified below.

This keeps the vacuuming time to a minimum:
using transit tanks 4A and 4B of reduced capacity;
simultaneously and alternately filling and emptying these transit tanks 4A and 4B; and
using a transfer unit 20 for emptying the transit tanks 4A and 4B, which is distinct from the suction unit 13 (or vacuum unit).

According to a preferred embodiment, the valves 4C, 4D, 4I and 4J are three-way valves. The valve 4J is arranged between a pumping hose 2A and the conduits 9A and 9B which together connect the pumping area 2 to the product inlets 5A and 5B of the transit tanks 4A and 4B. The valve 4J can be set in two orientations allowing to direct the pumping of the products to either of the transit tanks 4A and 4B. The valve 4I is arranged in the conduit 20A between the transfer pump 20 and the outlet orifices 7A and 7B. The valve 4I is adapted to allow the transfer of the non-gaseous products into the storage enclosure 3 from either the transit tank 4A or the transit tank 4B depending on its orientation. The valves 4C and 4D are each arranged on one of the conduits 17A, 17B which connect a suction orifice 6A, 6B to the suction unit 13.

The control system 25 can control the orientation of the three-way valves 4C, 4D, 4I and 4J simultaneously.

In this configuration shown in FIG. 1, the transit tank 4B is connected to the suction unit 13 by the conduits 17B and 18 and to the pumping area 2 by the conduits 9B and 2A. The transit tank 4A is in turn connected to the transfer unit 20 by the transfer conduit 20A which leads to the storage enclosure 3.

The control system 25 may alternatively simultaneously control the different orientations of the valves 4C and 4D and the orientation of the valve 4J for the filling of the transit tank 4B only and the orientation of the valve 4I for the draining of the transit tank 4A. Each of the valves 4C, 4D, 4I and 4D comprises two orientations. The first orientation of the valves 4C and 4D corresponds, respectively, to the opening of a venting of the transit tank 4A and to the opening of a communication of the transit tank 4B with the suction unit 13. The second orientation of the valves 4C and 4D corresponds, respectively, to the opening of a venting of the transit tank 4B and to the opening of a communication of the transit tank 4A with the suction unit 13. Furthermore, the first, respectively second, orientation of the valve 4I allows the opening, respectively closing, of the communication between the transit tank 4A and the storage enclosure 3 and the closing, respectively opening, of the communication between the transit tank 4B and the storage enclosure 3. The first, respectively second, orientation of the valve 4J allows the opening, respectively closing, of the communication between the pumping area 2 and the transit tank 4B, and the closing, respectively opening, of the communication between the transit tank 4A and the storage enclosure 3.

In this configuration shown in FIG. 2, the transit tank 4A is connected to the suction unit 13 by the conduits 17A and 18 and to the pumping area 2 by the transfer conduits 2A and 9A while the transit tank 4B is connected to the transfer pump 20 by the transfer conduit 20A which connects it to the storage enclosure 3.

The pumping device, as described above, implements a method for pumping products from the pumping area 2 to the storage enclosure 3. This pumping method, which generates a low vacuum evaporation of products, comprises a plurality of steps specified below.

According to a preferred embodiment, in order to carry out a vacuuming, the high-pressure pump 14 supplies high-pressure water to the hydro-ejectors 13A and 13B. More particularly, the high-pressure pump 14 allows to make the vacuum by injecting a high-pressure water in one of the hydro-ejectors 13A, 13B at a rate of 70 liters at 1000 bar corresponding to a power of 140 kilowatts and approximately 2500 cubic meters per hour of suction volume. With such power, the vacuum is quickly carried out. The acceleration of the water in the hydro-ejector 13A, 13B generates, by Venturi effect, a depression at the level of the suction mouths 16A and 16B. This air depression causes the transit tanks 4A and 4B to be vacuumed by means of the conduits 17A, 17B and 18. It may also generate a vacuuming in the storage enclosure 3 by means of the duct 3G if the products to be pumped comprise solid elements.

When the vacuum is carried out, the valve 13C of the hydro-ejector 13A is closed so as to cut off the flow rate of water entering this hydro-ejector 13A. The valve 13D, previously closed, is then opened so that the high-pressure pump 14 supplies high pressure water to the second hydro-ejector 13B. This hydro-ejector 13B uses, for example, 15 liters of water at a pressure of only 1000 bar to compensate for the air intakes. This reduction in flow rate allows a reduction in power consumption to approximately 30 kilowatts and 500 cubic meters per hour of suction flow. This phase allows for significant energy savings.

During a first step of controlling valves, the control system 25 controls:
the opening of the valve 3I which allows the communication between the suction unit 13 and the transit tanks 4A and 4B, the first orientation of the valves 4D and 4J so that the transit tank 4B is vacuumed by the suction unit 13 and fills with products coming from the pumping area 2, and
the first orientation of the valves 4C and 4I so that the transit tank 4A is vented and the transfer unit 20 transfers the non-gaseous products to the storage enclosure 3 which is at atmospheric pressure.

Therefore, the suction generated by the suction unit 13 leads to the pumping of the products from the pumping area 2 to the transit tank 4B by means of the conduits 2A and 9B as illustrated by the arrows in FIG. 1.

At the same time, the first orientation of the valve 4C which opens the transit tank 4A to the open air prevents the suction of product from the pumping area 2 into this transit tank 4A. The first orientation of the valve 4I puts the transfer outlet 7A of the transit tank 4A in communication with the positive displacement pump 20 to discharge the non-gaseous products resulting from a prior separation of the pumped products, to the storage enclosure 3 by means of the conduit 20A. The transit tank 4A then empties.

Alternatively to this first valve control step, during a second step, the control system 25 controls the second orientation of the valve 4C and the second orientation of the valve 4J so that the transit tank 4A is vacuumed by the suction unit 13 and fills up with products coming from the pumping area 2. Simultaneously, the control system controls the second orientation of the valve 4D and the second orientation of the valve 4I so that the transit tank 4B is vented and the transfer unit 20 transfers the non-gaseous products previously pumped into this transit tank 4B to the storage enclosure 3. The suction generated by the suction unit 13 leads to the pumping of the products from the pumping area 2 to the transit tank 4A by means of the conduits 2A and 9A as shown by the arrows in FIG. 2. The second orientation of the valve 4I puts the transfer outlet 7B of the transit tank 4B in communication with the positive displacement pump 20 to discharge the non-gaseous products resulting from a prior separation of the pumped products, to the storage enclosure 3 by means of the conduit 20A. The transit tank 4B then empties.

These two valve control steps are implemented alternately throughout the pumping process.

Thus, the two transit tanks 4A and 4B work alternately, which allows to limit the vacuum exposure time of the pumped products so as to limit the phenomena of desorption of the gases dissolved in the products. The maximum exposure time is 12 seconds.

A step of rejecting gases is implemented during the steps described above. During this gas rejection step, the gases generated by the separation of the products and by the desorption phenomena are rejected into a rejection area by means of the rejection network 19.

During the step of FIG. 1, simultaneously with the filling of the transit tank 4B by the products, the first orientation of the valve 4D allows the evacuation of the gases resulting from the pumping of products. These gases or non-gaseous products pass through the cyclone filter 23 and then the hydro-ejectors 13A and 13B where they are trapped by wetting in the water tanks 15A, 15B before being evacuated by the vertical pipeline 15C towards the rejection area.

Furthermore, during the step of FIG. 2, simultaneously with the filling of the transit tank 4A with the products, the second orientation of the valve 4C allows the evacuation of the gases resulting from the pumping of products. These gases pass through the cyclone filter 23 and then the hydro-ejectors 13A and 13B where they are trapped by wetting in the water tanks 15A, 15B before being evacuated by the vertical pipeline 15C towards the rejection area. The path of the non-gaseous products is illustrated by the arrow in FIG. 2.

During the gas rejection step, when pumping the products directly from the storage enclosure 3, the gases produced by desorption in the storage enclosure 3 flow through the conduits 3F and 15D to the water tank 15A, 15B and then are evacuated through the vertical pipeline 15C.

On the other hand, when the non-gaseous products contain solid elements and the suction unit 13 has generated a vacuuming of the storage enclosure 3 during the vacuuming step, the solid elements are stopped by the cyclone filter 23A by means of the duct 3G.

In addition, during a discharge (or drain) step, which may be implemented subsequent to the other steps of the method, the non-gaseous products present in the storage enclosure 3 may be discharged from the storage enclosure 3 to another area (not shown) by the transfer unit 20.

Within the scope of the present invention, the pumping device 1, as described, can be used for various (high pressure) operations or works.

The pumping device 1 and the storage enclosure 3 may form part of a product pumping and storage unit 29.

Figure 3:
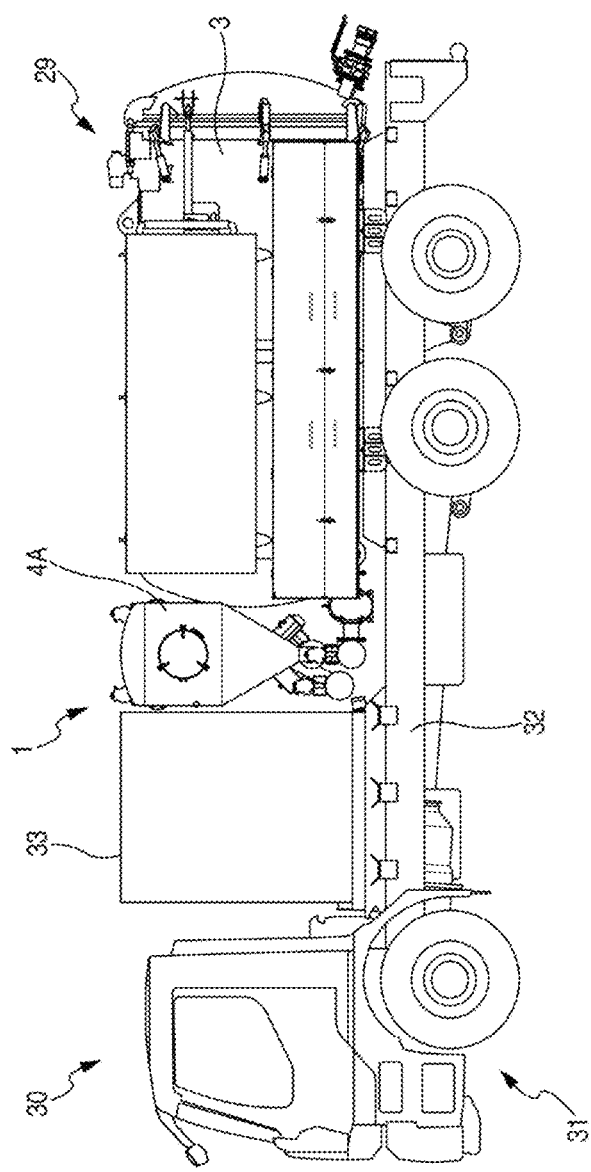
FIG. 3 is a side view of a hydro-cleaner, provided in particular with a pumping device and a storage enclosure (or tank).

In a preferred application, the unit 29 (thus comprising the pumping device 1 and the storage enclosure 3 is mounted on a hydro-cleaner 30 shown in FIG. 3. The hydro-cleaner 30 comprises a carrier vehicle 31 provided with a chassis 32 intended to receive equipment. The chassis 32 comprises, in particular, from the rear to the front, the storage enclosure 3 the transit tanks of which only the transit tank 4A is visible in FIG. 3, and a box 33 which comprises at least a part of the elements of the suction unit 13 and the discharge unit 20. The hydro-cleaner 30 may be a sewerage hydro-cleaner which is intended, in particular, to carry out cleaning and pumping operations of wastewater networks and sewerage works. The hydro-cleaner 30 can also be an industrial hydro-cleaner which is intended for cleaning works on industrial equipment and installations, and in particular for cleaning work on petroleum and para-petroleum sites.

The invention claimed is:

1. A device for pumping products from a pumping area (2) to a storage enclosure (3), said pumping device (1) comprising:

two transit tanks (4A, 4B) configured to receive the products to be pumped, separating into non-gaseous products and gaseous products, each of said transit tanks (4A, 4B) being provided with a product inlet (5A, 5B), a non-gaseous product drain outlet (7A, 7B) and a suction orifice (6A, 6B);

a transfer system (8) configured to generate a suction of the products from the pumping area (2) to said transit tanks (4A, 4B) and to generate a transfer of the non-gaseous products from said transit tanks (4A, 4B) to the storage enclosure (3);

a plurality of valves (3A, 3B, 3D, 3E, 3I, 4C, 4D, 4I, 4J) adapted to be controlled and configured to alternately either allow or block a communication of one of said transit tanks (4A, 4B) with the transfer system (8) and the pumping area (2) and a communication of the other of said transit tanks (4A, 4B) with the transfer system (8) to the storage enclosure (3); and a control system (25) of said plurality of valves (3A, 3B, 3D, 3E, 3I, 4C, 4D, 4I, 4J), wherein said transfer system (8) comprises:

a suction unit (13) provided with at least two hydro-ejectors (13A, 13B) connected to the suction orifice (5A, 5B) of each of said transit tanks (4A, 4B) and configured to at least generate the suction and the separation of the products to be pumped into gaseous and non-gaseous products, the suction of the products from the pumping area (2) being generated by a vacuuming of the transit tanks (4A, 4B) by limiting the vacuum exposure time; and a transfer unit (20) distinct from the suction unit (13), which is provided with a volumetric transfer pump connected to the drain outlet (7A, 7B) of each of said transit tanks (4A, 4B) and which is configured to at least generate the transfer of the non-gaseous products to the storage enclosure (3).

2. The pumping device as claimed in claim 1,
wherein the diameter of each of said transit tanks (4A, 4B) is between 70 centimeters and 80 centimeters.

3. The pumping device according to claim 1,
wherein the ratio between the volume and the upper surface of the transit tanks in contact (4A, 4B) with the products is between $\frac{1}{30}$ and $\frac{1}{25}$.

4. The pumping device according to claim 1,
wherein the suction unit (13) is provided with a high-pressure pump (14) supplying said at least two hydro-ejectors (13A, 13B) with high-pressure water, each of said at least two hydro-ejectors (13A, 13B) discharging the water into at least one water tank (15A, 15B) which supplies said high-pressure pump (14).

5. The pumping device according to claim 1, wherein it comprises a network (19) for rejecting the gases produced during the pumping to a rejection area, the rejection network comprising:
at least one conduit (17A, 17B) for rejecting the gases produced by said transit tanks (4A, 4B) and connecting the suction orifice (6A, 6B) of each of said transit tanks (4A, 4B) to said at least two hydro-ejectors (13A, 13B), said at least one conduit (17A, 17B) also contributing to the vacuuming by suction of each of said transit tanks (4A, 4B);
at least one water transfer conduit (18A, 15D) connecting said at least two hydro-ejectors to at least one water tank (15A, 15B); and
a pipeline (15) coming out of said at least one water tank (15A, 15B) so as to disperse the gases produced by said transit tanks (4A, 4B) in the rejection area.

6. The pumping device as claimed in claim 5,
wherein the rejection network (19) also comprises a first duct (3F) for rejecting the gases produced by desorption into the storage enclosure (3), connecting the storage enclosure (3) to said at least one water tank (15A, 15B).

7. The pumping device according to claim 1,
wherein the suction unit (13) is configured to generate a vacuuming of the storage enclosure (3), to assist in the direct pumping through a tail pipe of products comprising solid elements.

8. The pumping device according to claim 7,
wherein the rejection network (19) comprises a second duct (3G) for rejecting the gases produced by desorption into the storage enclosure (3), connecting said storage enclosure (3) to said at least two hydro-ejectors (13), said second duct (3G) also contributing to the vacuuming of the storage enclosure (3).

9. The pumping device according to claim 1,
wherein it comprises a cyclone filter (23) configured to filter the gases coming from each of said transit tanks (4A, 4B), said cyclone filter (23) being arranged between said at least two hydro-ejectors (13A, 13B) and each of said transit tanks (4A, 4B).

10. The pumping device according to claim 1,
wherein the transfer unit (20) is also configured to transfer said non-gaseous products from the storage enclosure (3) to another storage area.

11. A pumping and storage unit for products coming from a pumping area (2),
wherein it comprises a product pumping device (1) such as that specified in claim 1, as well as a storage enclosure (3).

12. A hydro-cleaner,
wherein it comprises a pumping and storage unit (29), such as that specified in claim 11.

* * * * *